(12) United States Patent
Ranjan

(10) Patent No.: US 10,484,263 B2
(45) Date of Patent: Nov. 19, 2019

(54) ROUTE-COST ACQUISITION FROM ROUTERS

(71) Applicant: International Business Machines Corporation, Armonk, NY (US)

(72) Inventor: Nishant Ranjan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 15/406,955

(22) Filed: Jan. 16, 2017

(65) Prior Publication Data

US 2018/0205632 A1    Jul. 19, 2018

(51) Int. Cl.
H04L 12/751 (2013.01)
H04L 12/721 (2013.01)

(52) U.S. Cl.
CPC ............ H04L 45/02 (2013.01); H04L 45/124 (2013.01)

(58) Field of Classification Search
CPC .............................. H04L 45/124; H04L 45/02
See application file for complete search history.

(56) References Cited

U.S. PATENT DOCUMENTS

| | | | |
|---|---|---|---|
| 6,389,448 B1 * | 5/2002 | Primak | H04L 67/1029 709/225 |
| 7,570,594 B2 | 8/2009 | Zhu et al. | |
| 7,848,240 B2 | 12/2010 | Previdi et al. | |
| 2004/0132409 A1 * | 7/2004 | Arnold | H04L 12/4625 455/67.11 |
| 2006/0167975 A1 * | 7/2006 | Chan | H04L 67/2819 709/203 |
| 2008/0279201 A1 | 11/2008 | Lu et al. | |
| 2009/0031415 A1 * | 1/2009 | Aldridge | H04L 63/0272 726/15 |
| 2009/0190482 A1 * | 7/2009 | Blair | H04L 43/0858 370/250 |
| 2010/0070623 A1 * | 3/2010 | Sawada | H04L 29/12301 709/224 |
| 2014/0153577 A1 * | 6/2014 | Janakiraman | H04L 47/122 370/392 |
| 2016/0006837 A1 * | 1/2016 | Reynolds | H04W 84/18 709/203 |
| 2016/0112300 A1 | 4/2016 | Kaiser et al. | |
| 2018/0062986 A1 * | 3/2018 | Murgia | H04L 45/64 |

* cited by examiner

*Primary Examiner* — Brandon M Renner
*Assistant Examiner* — Jay L Vogel
(74) *Attorney, Agent, or Firm* — Cantor Colburn LLP; Steven Chiu

(57) ABSTRACT

An aspect includes receiving a data packet and a destination address at a network endpoint that includes a plurality of network interfaces each configured for connection to a different router, one of the routers a default gateway router for the network endpoint. One of the network interfaces is selected for sending the data packet to the destination address based on a cost associated with sending the data packet to the destination address using a router connected to the selected network interface. The data packet is sent to the destination address using the router connected to the selected network interface, and the cost associated with sending the data packet to the destination address using any of the plurality of network interfaces is updated when the router connected to the selected network interface is the default gateway router.

14 Claims, 4 Drawing Sheets

ROUTE-COST ACQUISITION FROM ROUTERS

BACKGROUND

The present invention relates to computer networks, and more specifically, to route-cost acquisition from routers.

SUMMARY

Embodiments include a method, system, and computer program product for route-cost acquisition from routers. A method includes receiving a data packet and a destination address at a network endpoint that includes a plurality of network interfaces each configured for connection to a different router, one of the routers a default gateway router for the network endpoint. One of the network interfaces is selected for sending the data packet to the destination address based on a cost associated with sending the data packet to the destination address using a router connected to the selected network interface. The data packet is sent to the destination address using the router connected to the selected network interface, and the cost associated with sending the data packet to the destination address using any of the plurality of network interfaces is updated when the router connected to the selected network interface being the default gateway router.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
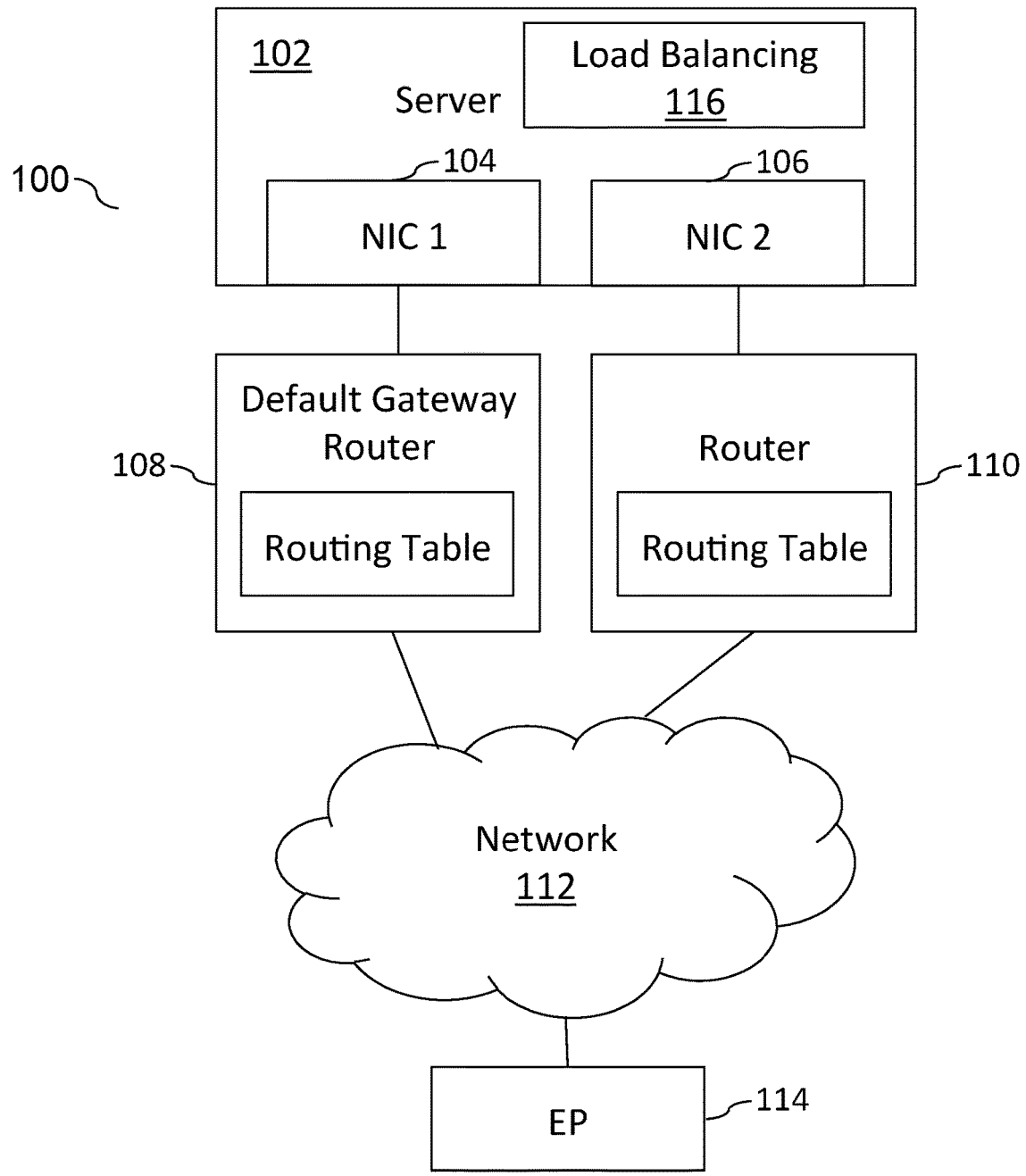
FIG. 1 illustrates a block diagram of a system for route-cost acquisition from routers in accordance with one or more embodiments.

Embodiments described herein relate to route-cost acquisition from routers for performing load balancing in a server (e.g., a network endpoint) that has multiple network interfaces (e.g., network interface cards or "NICs") and a single default gateway router. Generally, contemporary packet switching protocols only identify the outgoing interface of a router for a particular destination and routing cost is calculated using routing protocols. The routing protocols can include creating a weighted graph of the network and calculating the best path. Meanwhile, in contemporary implementations, all of the network endpoints (e.g., user traffic originating devices such as laptops, servers, smartphones, etc.) do not run the routing protocols nor are they privy to routing costs. These devices typically have a routing/forwarding table which is based on the IP address of an interface/netmask and a default gateway. If any other routing information is defined at a network endpoint, it is manually programmed and not protocol based. For all network endpoints which only have one interface, there is not much that can be done, since there is no choice of outgoing interface. But for servers that have two or more network interfaces that are connected to multiple routers, a static routing table with one default gateway can be too simplistic by routing all traffic to the default gateway and not to routers connected to the other network interfaces. In addition, running routing protocols and calculating route costs using central processing unit (CPU) intensive algorithms of graph theory can be overly burdensome in terms of resource usage.

In accordance with one or more embodiments, multiple network interfaces of a server can be utilized according to the network topology. The network endpoints generating traffic use the network in the best manner and simplify the task of provisioning networks. In accordance with one or more embodiments, a changing network topology and/or failing default gateway routes converge, resulting in traffic flowing in an optimum direction.

For example, assuming that a first network endpoint has to send data to a second network endpoint, and that during route selection the first network endpoint decides to use a default gateway router (also referred to herein as a "default gateway") and then proceeds with sending a packet on the default gateway. In accordance with one or more embodiments, the default gateway also sends a "route-cost-query" message out on all interfaces to the first network endpoint using the "protocol" field in the packet to signify a new control message. The route-cost-query messages are responded to by "route-cost-query-response" messages containing the costs of reaching the second network endpoint using each of the routers connected to the first network endpoint. Based on the route cost, type of interface (e.g., 1 gig, 10 gig, WLAN type etc.) and/or number of existing routes on a network interface, a route is added in the system. Based on usage and ageing processes (e.g., similar to what address resolution protocol or "ARP" uses) routes can be removed, re-validated, and/or changed. If multiple network interfaces have the same or similar cost to reach the second endpoint, then a load balancing approach can be used to maintain network stability by using, for example, tables that track age/usage of interfaces.

In accordance with one or more embodiments, initial and periodic discovery of routers is performed using the same protocol type packet but with a broadcast Internet protocol (IP) addresses as the destination IP address. All of the routers connected to the server that support the protocol then respond via a reply to the IP of the requesting server to indicate that the service is supported.

Once the server has the list of supported router IPs on each network interface, routers connected to those IP addresses will receive a route-cost-query message each time routing falls back to the default gateway router. Typical routing is concerned with link information for the next hop, this is contrasted with embodiments described herein which view the total cost of multiple interface options. Cost computations can be requested periodically (e.g., based on a refresh timer) or when a network configuration changes. All network endpoints reachable by different interfaces can respond to route-cost-query messages. In accordance with one or more embodiments, the routers are modified to support the new route-cost-query and route-cost-query-response messages.

Turning now to FIG. 1, a block diagram of a system 100 for route-cost acquisition from routers is generally shown in accordance with one or more embodiments. FIG. 1 includes a network endpoint that is implemented by server 102 which has two network interface connections (NICs), NIC 1 104 and NIC 2 106, as well as load balancing instructions 116 for performing all or a subset of the processing described herein. The network endpoint can be implemented by any device having a processor and a plurality of network interfaces and is not limited to a server as shown in FIG. 1. In addition, although only two NICs are shown in FIG. 1, load balancing between any number of NICs (e.g., 2, 4, 6, 8, etc.) can be performed by embodiments described herein as embodiments are not limited to two NICs.

As shown in FIG. 1, NIC 1 104 is connected to a default gateway router 108 and NIC 2 106 is connected to a router 110. Both the default gateway router 108 and the router 110 are connected to a network 112 which is connected to endpoint 114, which in the examples described herein is a destination endpoint.

Figure 2:
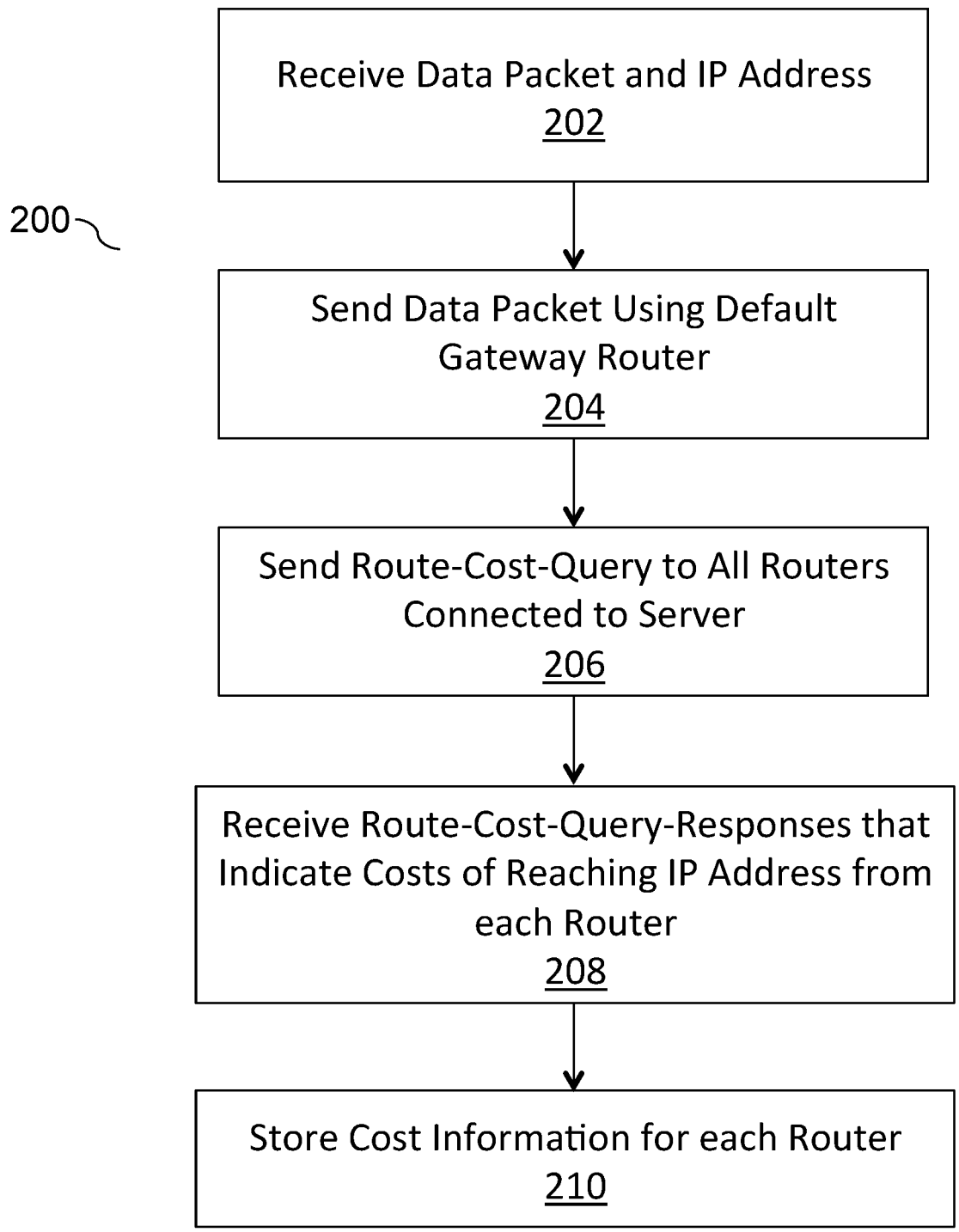
FIG. 2 illustrates a process flow for performing route-cost acquisition from routers in accordance with one or more embodiments.

Turning now to FIG. 2, a process flow 200 for performing route-cost acquisition from routers is generally shown in accordance with one or more embodiments. The processing shown in FIG. 2 can be performed by the load balancing instructions 116 executing on a processor located on a network endpoint such as server 102. At block 202, a data packet and a destination IP address which specifies a destination endpoint such as endpoint 114, are received at the network endpoint. The data packet and destination IP address can be received, for example from an application executing at the network endpoint. At block 204, the data packet is sent to the destination endpoint via a default gateway router such as default gateway router 108. In addition, block 206 is performed and a route-cost-query message is sent to each of the routers connected to the network endpoint. The route-cost-query message asks each router, such as default gateway router 108 and router 110, for a cost associated with sending the data packet from the network endpoint to the destination endpoint. At block 208, the network endpoint receives route-cost-query-responses from the routers. Each route-cost-query-response indicates a cost of reaching the destination endpoint. The cost information for each router is saved at the destination endpoint.

The processing shown in FIG. 2 can be performed for a number of iterations or a specified amount of time and/or until a specified condition is reached in order to initialize the system by collecting route cost data for routers connected to two or more of the network interfaces of the network endpoint. Once the cost data is collected, a process such as that shown in FIG. 3 can be performed to provide load balancing between the network interfaces.

Figure 3:
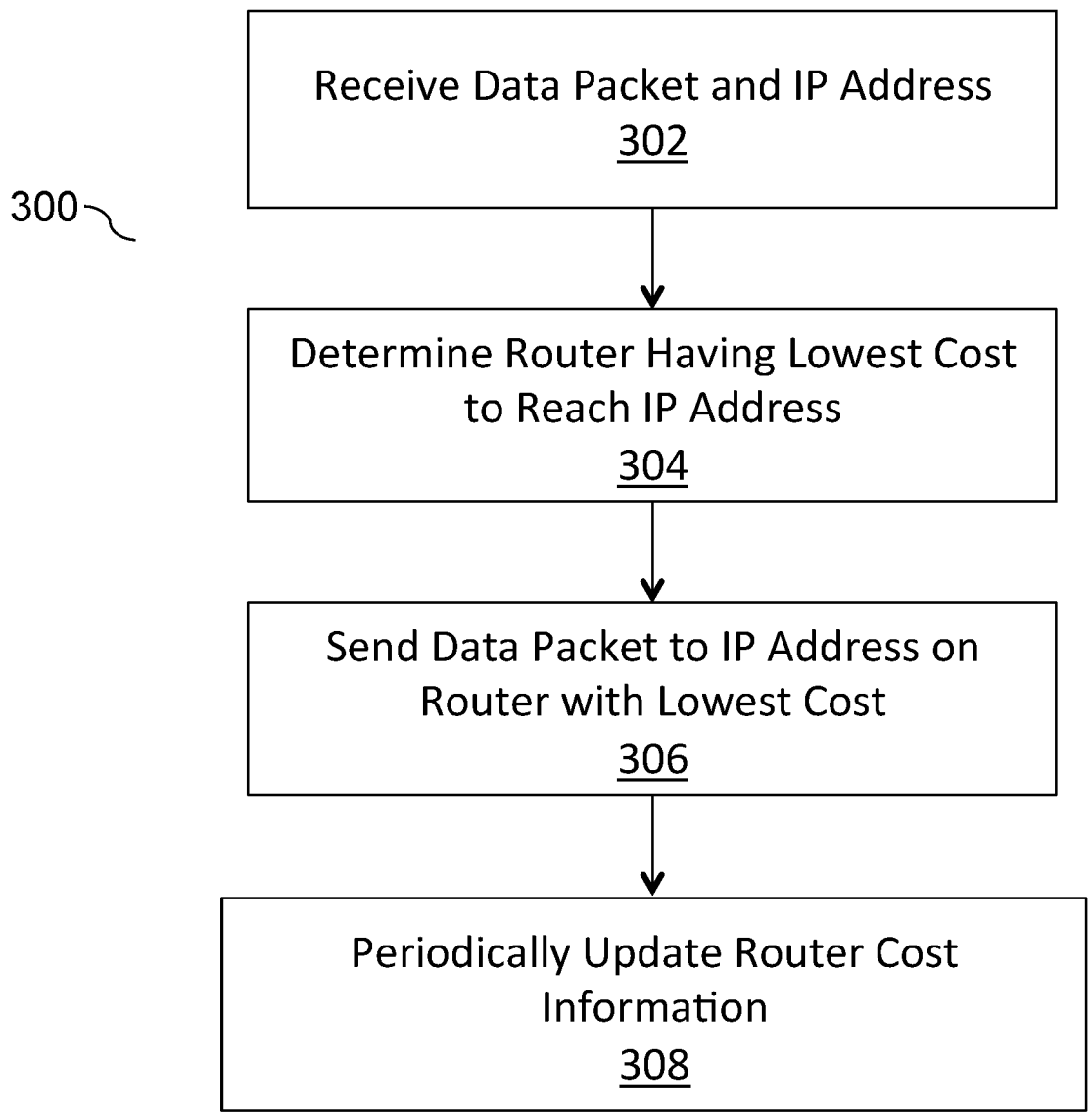
FIG. 3 illustrates an example of performing load balancing in accordance with one or more embodiments.

Turning now to FIG. 3, an example of a process flow 300 for performing load balancing is generally shown in accordance with one or more embodiments. The processing shown in FIG. 3 can be performed by the load balancing instructions 116 executing on a processor located on a network endpoint such as server 102. At block 302, a data packet and an IP address which specifies a destination endpoint such as endpoint 114, are received at the network endpoint. At block 304, it is determined which router connected to a network interface of the network endpoint has indicated the lowest cost for sending the data packet to the destination IP address. In accordance with one or more embodiments, a network interface is selected for sending the data packet to the destination address based on a cost associated with sending the data packet to the destination address using a router connected to the selected network interface. The network interface is selected when its associated cost is less than or equal to a cost associated with sending the data packet to the destination address using a different one of the routers connected to the network endpoint. The selecting can also be based on an application associated with the destination address and/or the size of the network connection (e.g., 1 gigabyte, 10 gigabytes) between the network interface, the router, and/or the network.

At block 306, the data packet is sent to the IP address via the router with the lowest cost, that is, the router connected to the selected network interface. At block 308, the router cost information is periodically updated. In accordance with one or more embodiments, any time that the default gateway router is connected to network interface selected for sending the data packet, the cost information for all of the routers associated with network interfaces on the network endpoint are updated, or verified. Updating the cost associated with sending the data packet to the destination address can include sending a route-cost-query request to each of the routers connected to the network interface on the network endpoint, and receiving back route-cost-query-responses indicating the cost associated with sending the data packet to the destination address for each of the routers connected to the network interfaces.

In accordance with one or more embodiments, the network endpoint is executing a Linux® or Windows® operating system for performing the processing described herein.

Figure 4:
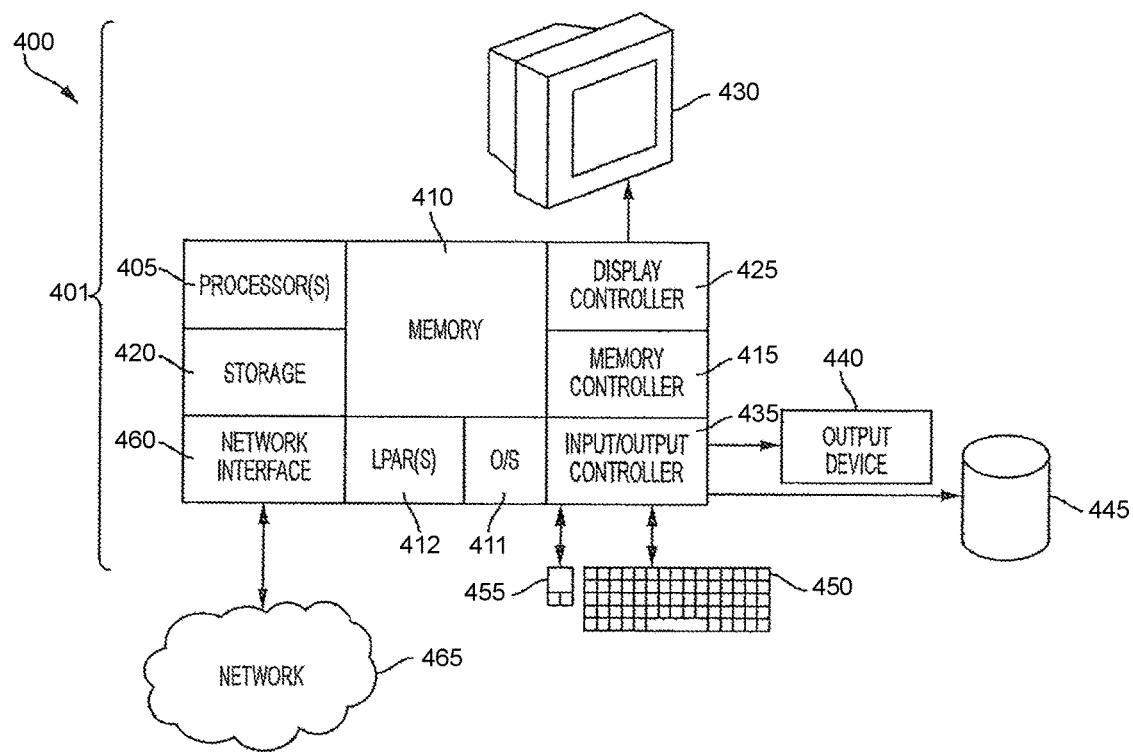
FIG. 4 illustrates a computer system for route-cost acquisition from routers in accordance with one or more embodiments.

Turning now to FIG. 4, a computer system for route-cost acquisition from routers is generally shown in accordance with one or more embodiments. In accordance with one or more embodiments the processing described herein is performed by a processor located on a memory controller 415 and the memory devices are contained in a memory 410. The methods described herein can be implemented in hardware, software (e.g., firmware), or a combination thereof. In an exemplary embodiment, the methods described herein are implemented in hardware as part of the microprocessor of a special or general-purpose digital computer, such as a memory controller or mainframe computer.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

Technical effects and benefits include the ability to move some of the load balancing from the routers and into a network endpoint. This can allow the network load to be spread more evenly between network interface and associated routers.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for route-cost acquisition from routers, the system comprising; a plurality of network interfaces at a server, each network interface comprising a network interface card and configured for connection to a different router, one of the routers a default gateway router for the server; a memory having computer readable instructions; and a processor for executing the computer readable instructions, the computer readable instructions including: receiving a data packet and a destination address; selecting one of the plurality of network interfaces for sending the data packet from the server to the destination address, the selecting based on a cost associated with sending the data packet to the destination address using a router connected to the selected network interface, wherein the cost is less than or equal to a cost associated with sending the data packet to the destination address using an other router connected to another network interface; sending the data packet to the destination address using the router connected to the selected network interface; and updating the cost associated with sending the data packet to the destination address using any of the plurality of network interfaces in response to the router connected to the selected network interface being the default gateway router, wherein the updating comprises sending a route-cost-query to each of the routers connected to the plurality of network interfaces and receiving a route-cost-query-response indicating the cost associated with sending the data packet to the destination address for each of the routers connected to the plurality of network interfaces, wherein the updating the cost associated with sending the data packet to the destination address using any of the plurality of network interfaces is not performed in response to the router connected to the selected network interface being different from the default gateway router.

2. The system of claim 1, wherein the selecting is further based on an application associated with the destination address.

3. The system of claim 1, wherein the selecting is further based on a size of the connection between a network interface and a router.

4. The system of claim 1, wherein based on the default gateway router and an other one of the routers having a same cost associated with sending the data packet to the destination address, selecting the other one of the routers.

5. The system of claim 1, wherein the receiving, selecting, sending, and updating are initiated by a Linux or Windows operating system executing on the processor.

6. The system of claim 1, wherein the destination address is an Internet protocol (IP) address.

7. A method comprising: receiving a data packet and a destination address at a server that includes a plurality of network interfaces, each network interface comprising a network interface card and configured for connection to a different router, one of the routers a default gateway router for the server; selecting one of the plurality of network interfaces for sending the data packet from the server to the destination address, the selecting based on a cost associated with sending the data packet to the destination address using a router connected to the selected network interface, wherein the cost is less than or equal to a cost associated with sending the data packet to the destination address using an other router connected to another network interface; sending the data packet to the destination address using the router connected to the selected network interface; and updating the cost associated with sending the data packet to the destination address using any of the plurality of network interfaces in response to the router connected to the selected network interface being the default gateway router, wherein the updating comprises sending a route-cost-query to each of the routers connected to the plurality of network interfaces and receiving a route-cost-query-response indicating the cost associated with sending the data packet to the destination address for each of the routers connected to the plurality of network interfaces, wherein the updating the cost associated with sending the data packet to the destination address using any of the plurality of network interfaces is not performed in response to the router connected to the selected network interface being different from the default gateway router.

8. The method of claim 7, wherein the selecting is further based on an application associated with the destination address.

9. The method of claim 7, wherein the selecting is further based on a size of the connection between a network interface and a router.

10. The method of claim 7, wherein based on the default gateway router and an other one of the routers having a same cost associated with sending the data packet to the destination address, selecting the other one of the routers.

11. The method of claim 7, wherein the receiving, selecting, sending, and updating are initiated by a Linux or Windows operating system executing on the network endpoint.

12. The method of claim 7, wherein the destination address is an internet protocol (IP) address.

13. A computer program product comprising a computer readable storage medium having program instructions embodied therewith, the program instructions executable by processing circuitry to cause the processing circuitry to perform: receiving a data packet and a destination address at a server that includes a plurality of network interfaces, each network interface comprising a network interface card and configured for connection to a different router, one of the routers a default gateway router for the server; selecting one of the plurality of network interfaces for sending the data packet from the server to the destination address, the selecting based on a cost associated with sending the data packet to the destination address using a router connected to the selected network interface, wherein the cost is less than or equal to a cost associated with sending the data packet to the destination address using an other router connected to another network interface; sending the data packet to the destination address using the router connected to the selected network interface; and updating the cost associated with sending the data packet to the destination address using any of the plurality of network interfaces in response to the router connected to the selected network interface being the default gateway router, wherein the updating comprises sending a route-cost-query to each of the routers connected to the plurality of network interfaces and receiving a route-cost-query-response indicating the cost associated with sending the data packet to the destination address for each of the routers connected to the plurality of network interlaces, wherein the updating the cost associated with sending the data packet to the destination address using any of the plurality of network interfaces is not performed in response to the router connected to the selected network interface being different from the default gateway router.

14. The computer program product of claim 13, wherein the selecting is further based on one or both of an application associated with the destination address and a size of the connection between a network interface and a router.

* * * * *